Figure 3:
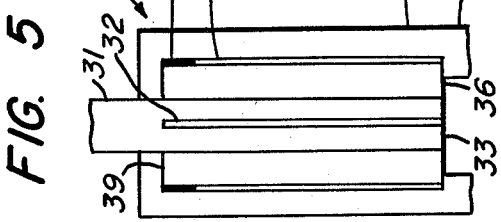

United States Patent [19]

Wiesboeck

[11] 4,214,609
[45] Jul. 29, 1980

[54] APPARATUS FOR DIVIDING GRAVITY FLOW LIQUID STREAM

[75] Inventor: Robert A. Wiesboeck, Stone Mountain, Ga.

[73] Assignee: United States Steel Corporation, Pittsburgh, Pa.

[21] Appl. No.: 955,857

[22] Filed: Oct. 30, 1978

[51] Int. Cl.$^2$ ............................................. A01C 23/02
[52] U.S. Cl. ........................................ 137/573; 111/7; 141/392; 222/564; 137/576; 137/592
[58] Field of Search ................... 111/6, 7; 62/51, 525, 62/517; 239/565; 138/37–46; 141/1, 392; 222/547, 564; 137/573, 576, 592

[56] References Cited

U.S. PATENT DOCUMENTS

| 3,335,963 | 8/1967 | Weis ..................................... 137/592 |
| 3,552,435 | 1/1971 | Anderson et al. .................. 137/592 |
| 3,978,681 | 9/1976 | Kjelgaard et al. ...................... 62/51 |

Primary Examiner—Houston S. Bell, Jr.
Attorney, Agent, or Firm—W. Gary Goodson

[57] ABSTRACT

Apparatus for dividing a gravity flow liquid stream into a plurality of separate streams of predetermined proportions comprising (a) a substantially vertical inner liquid inlet tube having a closed end, such end being that toward which the liquid is flowing, and this inner tube containing one or more substantially parallel vertically elongated openings beginning at the closed end of the tube, such openings being of such size as to cause a partial backup of liquid traveling toward the end of the tube; (b) a substantially vertical covering tube having a closed end and containing a plurality of substantially parallel vertically elongated openings, but offset from the vertically elongated opening or openings of the inner tube, and wherein the space between the inner surface of the covering tube and the outer surface of the inner tube, and the size of the vertical opening of the covering tube are such that a partial backup of liquid occurs between the inner tube and the covering tube; and (c) outlet means for collecting the liquid ammonia which passes out through the vertical openings of the covering tube into a plurality of separate streams.

19 Claims, 6 Drawing Figures

APPARATUS FOR DIVIDING GRAVITY FLOW LIQUID STREAM

FIELD OF THE INVENTION

This invention relates to an apparatus for dividing a gravity flow liquid stream, preferably of ammonia, into a plurality of separate streams of certain predetermined proportions. One aspect of this invention relates to an apparatus for dividing a stream of cold liquid ammonia into a plurality of streams and applying the same to the soil as a fertilizer.

BACKGROUND OF THE INVENTION

Conventional practice for dividing a stream of liquid into predetermined portions is based on the principle of orifice flow or the overflow over a notched weir.

In an orifice flow splitter, equal division of the liquid is achieved by flow through orifices of equal size. The flow rate can be varied by changing the pressure of the liquid upstream of the orifice.

If division of a liquid stream is to be accomplished substantially in the absence of pressure, that is by gravity flow, a notched weir is commonly used. Obviously, such a weir has to be perfectly level to function satisfactorily.

In certain applications of flow distributors such as in the fertilization of soil with anhydrous ammonia by the nonpressure method disclosed in U.S. Pat. No. 3,978,681, incorporated herein by reference, uniform distribution of a liquid through a multitude of hoses has to be accomplished by gravity flow.

The uniform distribution is achieved by the use of a distributor such as the one described in U.S. Pat. Application Ser. No. 786,302, filed Apr. 11, 1977, incorporated herein by reference. Typical maximum outlet connections range up to approximately 24 per distributor. However, it is desirable for larger field equipment to have more than 24 outlets to cover a broader width or to be able to place the application points more closely. Distributors with more than 24 outlets are impractical due to the excessive width required to accommodate the large number of hose connections.

To provide more than 24 outlets, two or more distributors have to be used. This arrangement not only provides a sufficiently large number of total outlets, but avoids excessive lengths of application hoses, as would be the case with a single large distributor. In fact, the total length of application hoses required for a given size of field equipment is less with two small distributors than with one large one.

However, the use of two distributors requires division of the feed stream into two equal portions. Therefore a device is necessary which is able to split a gravity-flow stream into equal portions over a wide range of flow rates.

Because of the nature of the application method, use of pressure is undesirable and detrimental. Furthermore, the apparatus for dividing a liquid stream has to be simple, compact, and rugged, preferably without moving parts, and has to function properly at various degrees of tilt since it is mounted on equipment being moved across fields which are not necessarily level.

For this reason, conventional flow splitters are not suited to meet the need of field application equipment when liquids are to be applied by gravity flow.

BRIEF DESCRIPTION OF THE INVENTION AND FIGURES

This invention relates to an apparatus for dividing a gravity flow liquid stream into a plurality of separate streams of predetermined proportions comprising (a) a substantially vertical inner liquid inlet tube having a closed end, such end being that toward which the liquid is flowing, and this inner tube containing one or more substantially parallel vertically elongated openings beginning at the closed end of the tube, such openings being of such size as to cause a partial backup of liquid traveling toward the end of the tube; (b) a substantially vertical covering tube having a closed end and containing a plurality of substantially parallel vertically elongated openings, but offset from the vertically elongated opening or openings of the inner tube, and wherein the space between the inner surface of the covering tube and the outer surface of the inner tube, and the size of the vertical opening of the covering tube are such that a partial backup of liquid occurs between the inner tube and the covering tube; and (c) outlet means for collecting the liquid ammonia which passes out through the vertical openings of the covering tube into a plurality of separate streams.

The apparatus of the invention is capable of dividing a gravity-fed liquid stream into two equal streams without requiring perfectly level positioning and constant flow rates. The device achieves precise, equal distribution of liquids over a wide range of flow rates which may be varied by a factor of approximately 2 to 8.

The working principle of the apparatus of this invention is based on the flow control which results when a liquid is forced through a vertically elongated opening. If two such openings of equal width are provided, the liquid will be split in two equal streams. Variations in flow rate will raise or lower the liquid level upstream of the control opening, thereby increasing or reducing the available cross-sectional area for liquid flow. To eliminate interference by turbulence or irregular flow through the inlet pipe, the liquid is forced to pass through a second set of vertically elongated openings in a covering tube.

A similar effect can be obtained by the use of multiple orifices arranged in a vertical pattern of one or more rows. However, this design is more prone to plugging and may require excessive height of the device to accomodate a large enough number of orifices. It is also more expensive to manufacture.

The apparatus of this invention can also be designed to divide a gravity-flow liquid into more than two streams of equal portions by providing multiples of vertically elongated openings or vertical orifice rows. By proper selection of opening widths or orifice size, any desired combination of stream distribution, equal or unequal, can be achieved.

This invention provided controlled division of a liquid, such as cold liquid ammonia, at substantially ambient or atmospheric pressure even when used on a field cultivator used on relatively hilly land. Furthermore, the apparatus of this invention is simple and rugged and can be utilized effectively for a wide range of flow rates.

Figure 5:
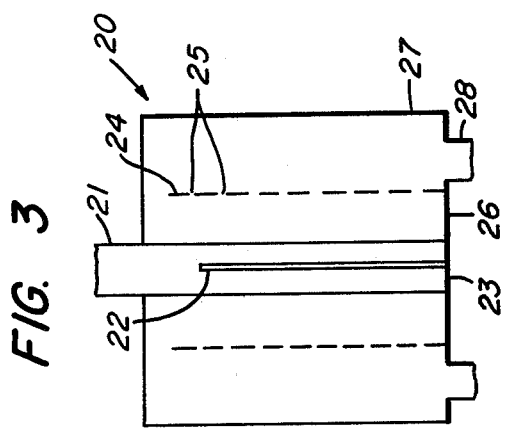
Figure 1:
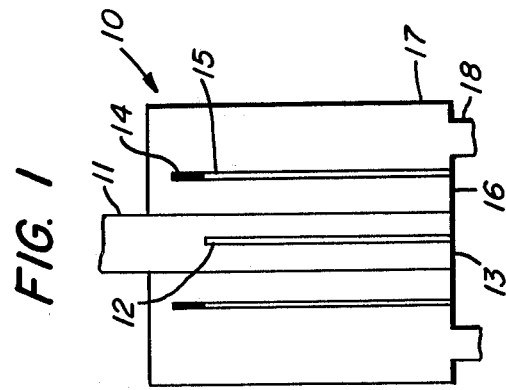

FIGS. 1, 3, and 5 represent side views of the liquid stream dividing apparatus of this invention.

Figure 4:
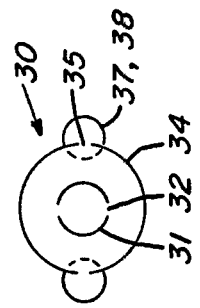
Figure 6:
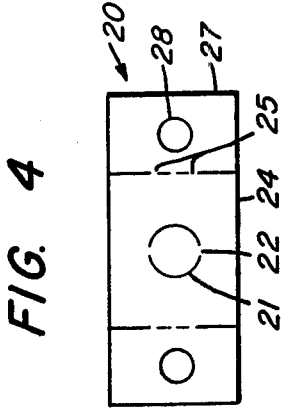
Figure 2:
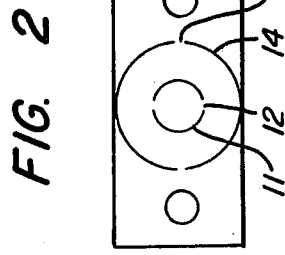

FIGS. 2, 4, and 6 represent top views of the liquid stream dividing apparatus of FIGS. 1, 3, and 5, respectively.

PREFERRED EMBODIMENT(S)

The flow dividing apparatus of this invention is useful for dividing a wide range of different liquid streams over a wide range of flow rates. However, a particularly preferred capacity range for cold liquid ammonia probably about 3 to about 20 gallons per minute. The initial liquid stream may be divided into a large number of different streams. However, for simplicity and ease of operation an apparatus which divides the flow into 10 streams is preferred.

The gravity flow liquid of this invention refers to a liquid, preferably ammonia, which flows downward primarily due to the forces of gravity.

The diameter of the covering tube is about 1.5 to about 3 times the diameter of the inner inlet tube and the width of the vertically elongated openings in both the inner tube and the covering tube are between about 0.05 and about 0.2 times the diameter of the inner tube and the vertical height of such openings are between about 3 and about 6 times the diameter of the inner tube. Preferably the vertically elongated openings in both the inner tube and the covering tube have a length between about 3 inches and about 6 inches and a width between about 0.05 inches and about 0.2 inches. Preferably the inner tube has an inner diameter of between about 0.75 inches and about 1.5 inches and preferably the covering tube has an inner diameter of between about 1.25 inches and about 2.0 inches.

A preferred apparatus is one wherein the inner tube and the covering tube each contain two vertically elongated openings. Preferably the plane containing the two vertically elongated openings of the covering tube are at a substantially orthagonal direction relative to the plane containing the two vertically elongated openings of the inner tube.

Preferably the closed end of the covering tube is at substantially the same vertical level as the closed end of the inner tube.

The outlet means preferably is in the form of an outer covering chamber which forms an annular space between the inner surface of such outer covering chamber and the outer surface of the covering tube, and wherein such outer covering chamber has liquid outlet openings in an otherwise closed bottom. When such opening is preferably located at a position near the bottom of each of the vertically elongated openings in the covering tube.

The apparatus of this invention comprises three concentrical chambers as shown in FIGS. 1 and 2. Although the chambers may be of any shape, the most advantageous design utilizes a cylindrical shape for the two inner chambers and a rectangular shape for the outer chamber. The size of the second chamber or covering tube is selected to fit tightly into the outer chamber or outlet means, thereby effectively dividing the outer chamber into two sections. The two inner chambers are provided with two vertically elongated openings or rows of orifices which are arranged in such a position that the openings of the inlet tube are off-set by 90°, as seen in a top view, from those of the covering tube. The third outer chamber or outlet means has two drain pipes in the bottom, preferably aligned or close to the openings of the covering tube.

In the operation of the liquid dividing apparatus of this invention, liquid enters the inner inlet tube, either through the top or bottom. From there it flows through the vertically elongated openings into the covering tube where it is forced to change its direction of flow. It discharges through another set of vertically elongated openings into the outlet means where it fails into the drain ports.

The function of the inlet tube is mainly to provide a smoothly flowing stream unaffected by irregular flow patterns. If the incoming flow is extremely erratic, entry of the liquid through the bottom of the inlet tube rather than the top is preferred. This is achieved by discharging the liquid from the inlet tube in a direction perpendicular to the openings of the covering tube. The smoothly flowing stream is then divided into two equal portions when if flows through the vertically elongated openings of the covering tube. The outer chamber or outlet means serves merely to collect the divided streams. Consequently, it may be divided into two separate sections as shown in FIGS. 5 and 6.

Important design features of the apparatus of this invention are as follows:

1. The overall width of the apparatus of this invention should be as small as possible to minimize sensitivity to tilt. Although the performance is completely independent to tilting in the direction of the slots in the inlet tube, tilting in the direction of the openings in the covering tube will affect the division of the liquid. Consequently, the distance between the openings in the covering tube should be kept to a minimum.

2. The width and length of the vertically elongated openings in the covering tube should be selected to achieve a minimum liquid level in the covering tube of at least 4 times such opening width at the minimum flow rate.

3. The preferred location and direction of discharge parts of the outlet means is directly adjacent to the openings of the covering tube, pointing downward.

4. The walls of the covering tube should leave an open space at the top to provide a separate path for the vapor or air, in case of vapor entrainment. This arrangement also allows for cleaning of the device when debris accumulates in the covering tube. In this case, the device can be inverted and flushed with a cleaning fluid.

FIG. 1 shows a side view of the liquid stream dividing apparatus 10 of this invention. A cross-sectional view of the inner inlet tube provides means for the initial liquid stream to be introduced by gravity flow into the apparatus 10. The gravity flow liquid then passes from the inner inlet tube through vertically elongated opening 12 into the space between the inlet tube 11 and the covering tube 14. The end 13 of the inner inlet tube 11 provides a barrier which causes the change in the direction of the gravity flow liquid. The end 16 also acts as a barrier to assist in causing a change of direction which results in the gravity flow liquid passing from the covering tube 14 through vertically elongated opening 15 into the outlet means 17 comprising a liquid outlet openings 18 for carrying the liquid out of the apparatus 10. By apparatus 10 a gravity flow liquid stream is divided into two substantially equal gravity flow liquid streams.

FIG. 2 is a top view of the apparatus 10 of FIG. 1. This view clearly shows how a line connecting the two vertically elongated openings 12 would essentially form right angles with a line connecting the vertically elongated openings 15. This view also shows the preferred cylindrical shape of inner inlet tube 11 and covering tube 14 with an annular space between the two tubes. Also it is shown how the liquid outlet opening 18 of outlet means 17 is located adjacent to vertically elongated openings 15.

FIGS. 3 and 4 show an apparatus 20 essentially identical to apparatus 10 of FIG. 1 except that the covering tube 24 is no longer cylindrically shaped and the vertically elongated opening 25 is in the form of rows of orifices.

FIGS. 5 and 6 show an apparatus 30 which is another variation of the apparatus 10 of FIG. 1 wherein the outlet means 37 is in the form of cylindrical tube positioned around the covering tube 34 in a manner so as to enable the gravity flow liquid from the vertically elongated openings 35 to be collected in the outlet means 37 and pass out the outlet openings 38. FIG. 5 also shows the top end 39 to the covering tube 34. Ordinarily the top end 39 is omitted for ease of cleaning the apparatus.

Specific dimensions and performance data of the subject stream dividing apparatus are shown in the following examples. Most performance data were determined with water instead of liquid ammonia to avoid the problem and inaccuracy of handling and weighing large quantities of liquid ammonia.

As apparent from the test data, the flow performance is most critical at the slow rates. Increasing rates lead to improved performance. Consequently, the flow splitters were tested mainly at the lower flow rates ranging from approximately 3 to 7 gallons per minute. Typical rates range up to 15 gallons per minute.

The following examples illustrate the subject invention.

EXAMPLE I

A stream dividing apparatus of the design shown in FIGS. 1 and 2 was used, having the following dimensions:

Inlet tube: 1-in. I.D. pipe with two 0.125×4-in. vertically elongated openings.
Covering tube: 2-in. I.D. pipe with two 0.125×4-in. vertically elongated openings.
Outlet means: 2.25×4.5 in I.D.
Height: 5 in.
Outlets: 0.75-in. I.D. pipe The device was tested in level position and with 5°–10° tilt by periodically collecting and weighing the discharge from each outlet. The result is reported as percent deviation between the outlets at various flows.

| Mounting Position | Flow, gpm | Outlet Flow Deviation, % | | | |
|---|---|---|---|---|---|
| | | Test 1 | Test 2 | Test 3 | Average |
| Level | 3.78 | 2.7 | 3.1 | 2.8 | 2.9 |
| | 5.04 | 0 | 1.4 | 0 | 0.5 |
| | 6.30 | 0 | 0 | 0 | 0 |
| | 12.86 | 0 | 0 | 0 | 0 |
| 5° Tilt* | 3.78 | 1.2 | 0 | 0.6 | 0.6 |
| | 5.04 | 0 | 1.3 | 0 | 0.5 |
| | 6.30 | 0 | 0 | 0 | 0 |
| 10° Tilt* | 3.78 | 3.9 | 2.6 | 3.1 | 3.2 |
| | 5.04 | 1.3 | 2.7 | 2.5 | 2.2 |
| | 6.30 | 2.8 | 3.8 | 2.8 | 3.1 |

*Tilted toward the wide side of the device.

EXAMPLE II

A stream dividing apparatus of the design in FIGS. 3 and 4 was used with the following dimensions:
Inlet tube: 1-in. I.D. pipe with two 0.125×3.5-in. vertically elongated openings.
Covering tube: 2×2-in. I.D. with orifice plate with 5 vertical rows of 0.125-in. holes, 7 holes per row.
Outlet means: 2×5-in. I.D.
Height: 4 in.
Outlets: 0.75-in. pipe

| Mounting Position | Flow, gpm | Outlet Flow Deviation, % | | | |
|---|---|---|---|---|---|
| | | Test 1 | Test 2 | Test 3 | Average |
| Level | 2.52 | 4.3 | 2.8 | 1.4 | 2.8 |
| | 3.78 | 1.4 | 2.8 | 2.9 | 2.4 |
| | 5.04 | 0 | 1.3 | 2.8 | 1.4 |
| | 6.30 | 0 | 0 | 1.3 | 0.4 |
| 5° Tilt | 2.52 | 13.2 | 14.0 | 10.9 | 12.7 |
| | 3.78 | 11.8 | 8.8 | 7.6 | 9.4 |
| | 5.04 | 9.7 | 8.3 | 8.3 | 8.8 |
| | 6.30 | 6.9 | 6.7 | 4.0 | 5.9 |

EXAMPLE III

The effect of the configuration of the inlet pipe on flow performance was determined by replacing the slotted inlet pipe of the stream dividing apparatus used in Example II (FIGS. 3 and 4) with a plain pipe of the same size protruding only 0.5 inches from the top into the apparatus.

| Flow, gpm | Outlet Flow Deviation, % | | | |
|---|---|---|---|---|
| | Test 1 | Test 2 | Test 3 | Average |
| 2.52 | 7.0 | 8.1 | 8.4 | 7.8 |
| 3.78 | 5.3 | 10.6 | 8.6 | 8.2 |
| 5.04 | 2.7 | 5.3 | 5.4 | 4.5 |
| 6.30 | 2.7 | 2.7 | 3.0 | 2.8 |

An additional test was performed with the inlet pipe extended to within 0.375 inch from the bottom:

| Flow, gpm | Outlet Flow Deviation, % | | |
|---|---|---|---|
| | Test 1 | Test 2 | Average |
| 2.52 | 16.6 | 8.9 | 12.7 |
| 3.78 | 9.2 | 7.5 | 8.3 |
| 5.04 | 1.4 | 2.8 | 2.1 |
| 6.30 | 2.9 | 1.4 | 2.1 |

The above examples are believed to show that the subject stream dividing apparatus can achieve precise division of a gravity-fed liquid independent of level mounting of the device. This is achieved by a simple, compact piece of equipment having a high degree of reliability due to its lack of moving parts.

I claim:

1. An apparatus for dividing a gravity flow liquid stream into a plurality of separate streams of certain predetermined proportions comprising
   (a) a substantially vertical inner liquid inlet tube with a closed end, said inner tube containing one or more substantially parallel vertically elongated openings beginning at such end of the tube, such openings being of such size so as to cause a partial backup of liquid traveling toward the end of the tube;
   (b) a substantially vertical covering tube having a closed end and containing a plurality of substantially parallel vertically elongated openings, but offset from the vertically elongated opening or openings of the inner tube, and wherein the space between the inner surface of the covering tube and the outer surface of the inner tube, and the size of the vertical opening of the covering tube are such that a partial backup of liquid occurs between the inner tube and the covering tube; and (c) outlet means for collecting the liquid which passes out through the vertical openings of the covering tube into a plurality of separate streams.

2. Apparatus as in claim 1 wherein the inner tube and the covering tube are each cylindrical.

3. Apparatus as in claim 2 wherein the inner tube and the covering tube are substantially concentric and wherein the apparatus is capable of handling liquid flow rates of between about 3 and about 20 gallons per minute.

4. Apparatus as in claim 2 wherein the inner tube and the covering tube each contain two vertically elongated openings.

5. Apparatus as in claim 4 wherein the plane containing the two vertically elongated openings of the covering tube are at a substantially orthagonal direction relative to the plane containing the two vertically elongated openings of the inner tube.

6. Apparatus as in claim 5 wherein the closed end of the covering tube is at substantially the same vertical level as the closed end of the inner tube.

7. Apparatus as in claim 6 wherein the vertically elongated openings in both the inner tube and the covering tube have a length between about 3 inches and about 6 inches and a width between about 0.05 inches and about 0.2 inches.

8. Apparatus as in claim 7 wherein the inner tube has an inner diameter of between about 0.75 inches and about 1.5 inches and wherein the covering tube has an inner diameter of between about 1.25 inches and about 2.0 inches.

9. Apparatus as in claim 1 wherein the outlet means is in the form of an outer covering chamber which forms an annular space between the inner surface of such outer covering chamber and the outer surface of the covering tube, and wherein such outer covering chamber has liquid outlet openings in an otherwise closed bottom, one such opening being located at a position near the bottom of each of the vertically elongated openings in the covering tube.

10. Apparatus as in claim 6 wherein the closed ends of the inlet tube and the covering tube are both bottom ends.

11. Apparatus as in claim 1 wherein the diameter of the covering tube is between about 1.5 to about 3 times the diameter of the inner inlet tube and wherein the width of the vertically elongated openings in both the inner tube and the covering tube are between about 0.05 and about 0.2 times the diameter of the inner tube and wherein the vertical height of such openings are between about 3 and about 6 times the diameter of the inner tube.

12. An apparatus for dividing a gravity flow liquid ammonia stream at substantially atmospheric pressure into a plurality of separate streams of certain predetermined proportions comprising (a) a substantially vertical inner liquid inlet tube with a closed end, said inner tube containing a plurality of substantially parallel vertically elongated openings beginning at such end of the tube, such openings being of such size so as to cause a partial backup of liquid traveling toward the end of the tube;

(b) a substantially vertical covering tube having a closed end and containing a plurality of substantially parallel vertically elongated openings, but offset from the vertically elongated openings of the inner tube, and wherein the space between the inner surface of the covering tube and the outer surface of the inner tube, and the size of the vertical opening of the covering tube are such that a partial backup of liquid occurs between the inner tube and the covering tube; and (c) outlet means for collecting the liquid ammonia which passes out through the vertical openings of the covering tube into a plurality of separate streams, said apparatus being capable of handling liquid flow rates of between about 3 and about 20 gallons per minute.

13. Apparatus as in claim 12 wherein the inner tube and the covering tube are each cylindrical and wherein the inner tube and the covering tube are substantially concentric.

14. Apparatus as in claim 13 wherein the inner tube and the covering tube each contain two vertically elongated openings.

15. Apparatus as in claim 14 wherein the planes containing the two vertically elongated openings of the covering tube are at a substantially orthagonal direction relative to the plane containing the two vertical openings of the inner tube.

16. Apparatus as in claim 15 wherein the closed end of the covering tube is at substantially the same vertical level as the closed end of the inner tube.

17. Apparatus as in claim 16 wherein the vertical openings in both the inner tube and the covering tube have a length between about 3 and about 6 inches and a width between about 0.05 inches and about 0.2 inches.

18. Apparatus as in claim 17 wherein the inner tube has an inner diameter of between about 0.75 inches and about 1.5 inches and wherein the covering tube has an inner diameter of between about 1.25 inches and about 2.0 inches.

19. Apparatus as in claim 13 wherein the outlet means is in the form of an outer covering chamber which forms an annular space between the inner surface of such outer covering chamber and the outer surface of the covering tube, and wherein such outer covering chamber has liquid outlet openings in an otherwise closed bottom, one such opening being located at a position near the bottom of each of the vertical openings in the covering tube.

* * * * *